3,062,745
GLASS GRINDING PROCESS EMPLOYING A
NON-FOAMING OILINESS AGENT
James W. Gaynor, Valparaiso, Ind., and Paul C. Vienna, Calumet City, Ill., assignors to Standard Oil Company, Chicago, Ill., a corporation of Indiana
No Drawing. Filed Dec. 2, 1958, Ser. No. 777,591
2 Claims. (Cl. 252—56)

This invention relates to additives for fluids used in glass grinding operations. More particularly, this invention relates to an anti-foam and oiliness agent for use in such glass-grinding fluids.

In the grinding of glass such as the grinding of glass plates and the grinding of optical glass into lenses, prisms, and other optical forms, whether by hand or by machine, it is highly desirable and common practice to use a glass-grinding fluid between the glass work-piece and the grinding implement to keep the work surface relatively cool, to lubricate the grinding surface, to aid in carrying detritus including residue glass particles away, to prevent loading and ultimate seizure of the working surface and grinding tools. Generally, an oiliness agent is incorporated into base glass-grinding fluids to assist in these functions by maintaining a film of fluid on the glass working surface under pressure of the grinding tool. The pressures on the working surface are normally not extreme and therefore an oiliness agent is generally sufficient to maintain such a film. Among the common oiliness agents are the oil-soluble carboxylic acids and particularly the oil-soluble fatty acids such as oleic acid, acids from lard oil, acids from tall oil, etc. These oiliness agents find preferred use in glass-grinding operations because of their availability and desirable oiliness properties. It has been found that using such oiliness agents in glass-grinding operations causes excessive foaming of the fluid on the work surface, inhibiting oiliness film formation. It is conventional practice in glass-grinding operations to continually reuse the glass-grinding fluid as often as possible for economy in operation. The foaming of the oil-soluble carboxylic acid-containing fluid increases with reuse and soon is unsuitable for glass-grinding operations. Further, the foaming causes overflow of glass-grinding fluid from the glass grinding surface and other means normally provided to collect the fluid for reuse thereby creating excessive waste through unrecovered fluid.

We have discovered that foaming in a carboxylic acid-containing glass-grinding fluid may be overcome by using from about 0.25 to about 10.0 weight percent of an oil-soluble ester of a low molecular weight alcohol and a carboxylic acid in lieu of the carboxylic acid oiliness agent. Our discovery is based on the theory that the foaming of a glass-grinding fluid containing a carboxylic acid is caused by soap formed through saponification of the acid with alkali and alkaline earth metal substances contained in the glass, and particularly sodium. We have substantially eliminated soap formation in such glass-grinding fluids by using an oil-soluble low molecular weight alcohol ester of the carboxylic acid as an anti-foam agent and oiliness agent. The oil-soluble anti-foam ester may conveniently be obtained from reacting a low molecular weight alcohol with a carboxylic acid, a reaction known to the art. The alcohol is a low molecular weight alkyl alcohol preferably having from one to about four carbon atoms. Such low molecular weight alcohols include methanol, ethanol, propanol, isopropanol, butanol, isobutanol or mixtures thereof. Methanol is particularly preferred. The acid is any carboxylic acid which will allow solubility of the ester in the fluid. Such carboxylic acids include those acids which exhibit good oiliness properties such as naphthenic acids and fatty acids and preferably those fatty acids having from 12 to 18 carbon atoms and their dimer and trimer acid derivatives. The carboxylic acid is advantageously unsaturated for greater solubility and may conveniently be used in admixture with other components such as unsaturated fatty acids obtained from various chemical processes as by-products which are readily available and inexpensive. Such admixtures include acids from tall oil and acids from lard oil. The acids from lard oil and tall oil are predominantly in the $C_{12}$ to $C_{18}$ range and contain substantial amounts of oleic acid. Oleic acid is the particularly preferred fatty acid and the preferred ester is methyl oleate.

The base fluid to which the ester is added may be any known glass-grinding fluid and is normally a hydrocarbon fluid, either natural or synthetic, for example as obtained by the polymerization of olefins, such as ethylene, propylene and butylenes. The base fluid is selected for use in a particular glass-grinding operation by the requirements of that operation as to lubricating properties, cooling properties, detritus-removing properties, load-bearing properties, and viscosity; and such choice of base fluid comprises no part of the present invention. In selecting the base fluid, mineral oils should be preferred; vegetable or animal oils have certain disadvantages including objectionable odor and a tendency to become rancid. The base fluid should have a viscosity of less than 300 SSU at 100° F. so it will readily flow to the work surface. Although fluids of the lubricating oil range, such as paraffin base or naphthene base lubricants may be used, it is preferred to use a lighter colored and less viscous base fluid having a viscosity in the range from about 50 to 120 SSU at 100° F. for improved fluidity over the work surface which is at a low temperature in comparison with the higher temperature metal-grinding operations. The base fluid may be composed of materials of widely divergent viscosities using mixtures of low and high viscosity fluids but such mixtures must be fluid at the glass-working temperature. Among the low viscosity fluids more advantageously used as base fluids for the glass-grinding compositions are gas oil, kerosene, kerosene distillate, light paraffin oils, fuel oil, straw oil, etc., and mineral seal oil is particularly preferred.

The herein described esters are used as anti-foaming and oiliness additives to base glass-grinding fluids in varying amounts of from about 0.25 up to about 10.0 weight percent. It is also contemplated that various well known desirable additives may be incorporated into the fluid containing the anti-foam additive of this invention. Accordingly, masking agents such as pine oil may be used to cover objectionable odor such as that obtained where kerosene which is not of the purity of perfection kerosene is used as a component of the fluid. Also, where considered desirable, as in the much higher-than-normal grinding pressures, a film strength agent such as an ester of a phosphorus acid, for example, phosphoric acid, phosphorus acid, etc. or an extreme pressure agent such as chlorinated and/or sulfurized hydrocarbons, sulfurized sperm oil, etc. may be incorporated into the fluid.

*Example*

This example is submitted herein to give a comparative illustration of the use of free acid and ester as anti-foaming and oiliness agents. Accordingly, a composition containing 57% perfection kerosene, 42% mineral seal oil, and 1% oleic acid was prepared and used in a glass-grinding operation in a glass-grinding machine. The product foamed excessively in the glass-grinding machine and the fluid was not suitable for continued reuse. In accordance with the present invention, a composition containing 42% mineral seal oil and 57% perfection kerosene as the base fluid with 1% methyl oleate as the additive was prepared and used as a glass-grinding fluid in a glass-grinding operation. The methyl oleate-containing fluid was found to completely eliminate undesirable foaming and allow continued reuse of the fluid while also contributing sufficient desirable oiliness properties to the fluid.

Concentrates of a glass-grinding fluid base containing more than 10%, for example up to 50% or more, of the esters of this invention alone or in combination with other additives can be used for blending in the proportions desired for particular conditions of use to give a finished glass-grinding fluid product containing the esters of this invention.

We claim:

1. A process for grinding glass in the presence of an oiliness agent which process comprises coating the work surface of a glass workpiece with a normally liquid hydrocarbon glass-grinding lubricant of viscosity less than 300 SSU at 100° F. and from about 0.25 to about 10 weight percent of an oiliness agent consisting essentially of an oil-soluble ester of a low molecular weight alkyl alcohol having from one to about 4 carbon atoms and a fatty acid having from about 12 to about 18 carbon atoms in an amount sufficient to impart oiliness properties to said glass-grinding fluid, and grinding said work surface.

2. The process of claim 1 wherein said ester is methyl oleate.

References Cited in the file of this patent

UNITED STATES PATENTS

| | | |
|---|---|---|
| 2,132,138 | Williams et al. | Oct. 4, 1938 |
| 2,179,067 | Smith | Nov. 7, 1939 |
| 2,210,140 | Colbeth | Aug. 6, 1940 |
| 2,224,541 | Frolich | Dec. 10, 1940 |
| 2,236,590 | Backoff et al. | Apr. 1, 1941 |
| 2,298,465 | Clapsadle | Oct. 13, 1942 |
| 2,371,655 | Smith et al. | Mar. 20, 1945 |
| 2,796,363 | Lalone | June 18, 1957 |
| 2,813,045 | Abbott | Nov. 12, 1957 |
| 2,830,956 | Wasson et al. | Apr. 15, 1958 |
| 2,865,859 | Lubowe | Dec. 23, 1958 |
| 2,899,390 | Plemich | Aug. 11, 1959 |